UNITED STATES PATENT OFFICE.

JOHN EDWARD NOE, OF SAN FRANCISCO, CALIFORNIA.

COMPOSITION FOR SEALING PUNCTURES IN PNEUMATIC TIRES.

No. 825,930.  Specification of Letters Patent.  Patented July 17, 1906.

Application filed May 31, 1905. Serial No. 263,179.

*To all whom it may concern:*

Be it known that I, JOHN EDWARD NOE, a citizen of the United States, residing at San Francisco, in the county of San Francisco and State of California, have invented a new and useful Composition of Matter to be used for Sealing Punctures in Pneumatic Tires and the Like, of which the following is a specification.

My composition consists of the following ingredients: a powdered mixture of equal parts of asbestos and magnesia, four ounces; Irish moss, two and one-half ounces; flaxseed, one and one-third ounces; formaldehyde, one table-spoonful; powdered borax, five-twelfths of an ounce; cloves, one-fourth of an ounce; water, three quarts and one and one-sixth pints. These ingredients are compounded as follows: Boil two and two-thirds ounces of Irish moss in two and one-half quarts of water for thirty minutes and then strain through a No. 10 screen. Then boil one and one-third ounces of whole flaxseed in one quart of water fifteen minutes and strain through a No. 10 screen. Then add this to the moss. Next boil one-fourth of an ounce of cloves in one-sixth of a pint of water for ten minutes, strain through a No. 10 screen, and mix with the moss and flaxseed. Then add to the mixture five-twelfths of an ounce of powdered borax and mix well. Take two ounces each of asbestos (No. 3 quality suffices) and of magnesia, pulverize and mix together, and then add one pint of boiling water. Stir this well and add it to the mixture of moss, flaxseed, and cloves and mix well, but do not whip or beat the mixture. Now add one tablespoonful of formaldehyde and mix the whole and cover with a muslin cloth, a blanket, a sheet of blotting-paper, or other suitable substance which will absorb the moisture which rises while the composition is cooling.

Care must be exercised that at no time in boiling any of the mixtures are burned or scorched, and for this reason steam-heat is by far the most preferable.

The method of using the above-described composition is to apply the same to the inner surfaces of rubber goods to prevent leaking when a puncture has been effected. To apply to a pneumatic tire, remove the check from the tire-valve and pump in about one pint for a bicycle-tire and about one quart for an automobile-tire. The motion of the tire when running will spread this in an even coat over the inner surface. In this case if a nail is introduced into the tire it may be pulled out and the above composition will prevent a leak. If the rupture is a large one, so that the edges of the opening do not touch, a few stitches may be taken, if the tire is made of canvas and rubber, and a tape wrapped securely around it. If the tire is pure rubber, stitches should never be taken; but a tape should be wrapped securely around it and the composition should be permitted to run over the inner surface of the tire at the place mended, and there will be no leak.

Ordinary muslin will become air-tight with this improved composition.

This composition does not injure rubber, but tends to preserve the same, and old rubber treated in the manner above described will be found much improved. The composition is not a glue, and fermentation will not set in whether it is exposed or is not. It can be washed out with cold water.

I claim—

1. The herein-described composition comprising a powdered mixture of asbestos and magnesia, Irish moss, and water, substantially in the proportions specified.

2. The herein-described composition comprising a powdered mixture of asbestos and magnesia, Irish moss, flaxseed, and water, substantially in the proportions specified.

3. The herein-described composition comprising a powdered mixture of asbestos and magnesia, Irish moss, flaxseed, formaldehyde, and water, substantially in the proportions specified.

4. The herein-described composition comprising a powdered mixture of asbestos and magnesia, and Irish moss, flaxseed, formaldehyde, borax, and water, substantially in the proportions specified.

5. The herein-described composition compising a powdered mixture of asbestos and magnesia, Irish moss, flaxseed, formaldehyde, borax, cloves, and water, substantially in the proportions specified.

6. The herein-described composition containing powdered magnesia, Irish moss, and water, substantially in the proportions specified.

7. The herein-described composition containing powdered asbestos, Irish moss, and water, substantially in the proportions specified.

8. The herein-described composition containing powdered magnesia, flaxseed, and water, substantially in the proportions specified.

9. The herein-described composition containing powdered asbestos, flaxseed, and water, substantially in the proportions specified.

10. The herein-described composition containing pulverulent material of low specific gravity, Irish moss, flaxseed, and water, substantially in the proportions specified.

11. The herein-described composition containing pulverulent material of low specific gravity, Irish moss, flaxseed, an antiseptic and water, substantially in the proportions specified.

JOHN EDWARD NOE.

Witnesses:
CHRIS JOHNSON,
JNO. JOHNSON.